(12) United States Patent
Shih et al.

(10) Patent No.: US 12,044,628 B2
(45) Date of Patent: Jul. 23, 2024

(54) OPTICAL DETECTION DEVICE AND DETECTION METHOD THEREOF

(71) Applicant: Aspect Microsystems Corp., Taipei (TW)

(72) Inventors: Mingshun Shih, Taipei (TW); Jung-Fu Liao, Taipei (TW)

(73) Assignee: Aspect Microsystems Corp., Taipei (TW)

( * ) Notice: Subject to any disclaimer, the term of this patent is extended or adjusted under 35 U.S.C. 154(b) by 288 days.

(21) Appl. No.: 17/674,864

(22) Filed: Feb. 18, 2022

(65) Prior Publication Data

US 2022/0268708 A1  Aug. 25, 2022

(30) Foreign Application Priority Data

Feb. 20, 2021 (TW) ................. 110105926

(51) Int. Cl.
| | |
|---|---|
| *G01N 21/89* | (2006.01) |
| *G01S 7/481* | (2006.01) |
| *G01S 7/4911* | (2020.01) |
| *G01S 7/4914* | (2020.01) |
| *G01S 17/58* | (2006.01) |
| *G05D 13/62* | (2006.01) |

(52) U.S. Cl.
CPC ........ *G01N 21/8903* (2013.01); *G01S 7/4815* (2013.01); *G01S 7/4911* (2013.01); *G01S 7/4914* (2013.01); *G01S 17/58* (2013.01); *G05D 13/62* (2013.01); *G01N 2021/8908* (2013.01)

(58) Field of Classification Search
CPC ....... G01N 21/8903; G01N 2021/8908; G01N 2021/8909; G01S 7/4815; G01S 7/4911; G01S 7/4914; G01S 17/58; G05D 13/62; G01V 8/20; G01D 5/32; G01P 3/36
See application file for complete search history.

(56) References Cited

U.S. PATENT DOCUMENTS

| | | | |
|---|---|---|---|
| 5,212,392 A | 5/1993 | Berkcan et al. | |
| 6,100,537 A * | 8/2000 | Abraham ............. | G01N 21/896 |
| | | | 250/559.22 |
| 2009/0244551 A1 * | 10/2009 | Lutz ..................... | B65G 65/005 |
| | | | 356/630 |
| 2010/0092127 A1 | 4/2010 | Sasaoka et al. | |
| 2011/0222051 A1 | 9/2011 | Heng | |
| 2016/0018314 A1 | 1/2016 | Hamada et al. | |

(Continued)

FOREIGN PATENT DOCUMENTS

| | | |
|---|---|---|
| CN | 101027553 | 8/2007 |
| CN | 101382500 | 3/2009 |

(Continued)

*Primary Examiner* — Edmond C Lau
*Assistant Examiner* — Carlos Perez-Guzman
(74) *Attorney, Agent, or Firm* — JCIPRNET

(57) ABSTRACT

An optical detection device and a detection method thereof are provided. A linear light source provides a light curtain formed by multiple light beams, the light curtain is located on a transportation path of transporting an object to be detected. A sensor set senses the part of light beams not interrupted by the object to be detected, so as to generate a sensing signal with various strengths. A control circuit determines a physical characteristic, moving speed and position of the object to be detected according to the strength of the sensing signal.

12 Claims, 5 Drawing Sheets

(56) References Cited

U.S. PATENT DOCUMENTS

2017/0052278 A1* 2/2017 Stein ................. G01V 8/20
2021/0333371 A1* 10/2021 Pacala ............... G01S 7/4816

FOREIGN PATENT DOCUMENTS

| CN | 102037343 | 4/2011 |
| CN | 107219195 | 9/2017 |
| TW | I648540 | 1/2019 |
| TW | I673486 | 10/2019 |
| TW | I673491 | 10/2019 |

* cited by examiner

OPTICAL DETECTION DEVICE AND DETECTION METHOD THEREOF

CROSS-REFERENCE TO RELATED APPLICATION

This application claims the priority benefit of Taiwan application serial no. 110105926, filed on Feb. 20, 2021. The entirety of the above-mentioned patent application is hereby incorporated by reference herein and made a part of this specification.

BACKGROUND

Technical Field

The disclosure relates to a detection device, and more particularly, to an optical detection device.

Description of Related Art

Optical detection is a method that uses the interaction of light and a substance to detect the substance. Since the detection using light usually does not cause too much damage to the substance itself, it is preferable to use it to detect various substances. The use of optical detection to replace conventional manual detection can not only improve production efficiency, but also improve detection accuracy. Therefore, how to improve the detection efficiency by utilizing the optical properties is the subject of people skilled in the art.

SUMMARY

The disclosure provides an optical detection device and a detection method thereof, which can effectively improve detection efficiency.

An optical detection device according to the disclosure includes at least one linear light source, at least one sensor set, and a control circuit. The linear light source provides a light curtain formed by multiple light beams, and the light curtain is located on a transportation path of transporting an object to be detected, and the object to be detected passes through the light curtain while being transported. The sensor set is disposed on a transmission path of the light beams, and the linear light source and the sensor set are disposed on both sides of the transportation path, and the sensor set senses the light beams not interrupted by the object to be detected to generate a sensing signal with different strengths. The control circuit is coupled to the linear light source and the sensor set, and the control circuit determines a physical characteristic, a moving speed and a position of the object to be detected according to the sensing signal.

In an embodiment of the disclosure, the linear light source includes multiple light emitting parts or uses a light guide, and the light emitting parts are disposed in a straight line, a curved line or a polyline.

In an embodiment of the disclosure, the sensor set may includes multiple sensor parts disposed in a straight line, a curved line or a polyline at equal distances corresponding to the linear light source.

In an embodiment of the disclosure, the sensor set may further include a lens module, and the lens module adjusts a range of the light beams not interrupted by the object to be detected irradiating the sensor parts according to sensing areas of sensing surfaces of the sensor parts of the sensor set.

In an embodiment of the disclosure, the physical characteristic of the object to be detected includes at least one of a quantity, a density, a size and a thickness of the object to be detected.

In an embodiment of the disclosure, the control circuit further controls a time for enabling the linear light source and the sensor set.

In an embodiment of the disclosure, the optical detection device further includes a transportation tool coupled to the control circuit and controlled by the control circuit to adjust a speed of transporting the object to be detected along the transportation path.

In an embodiment of the disclosure, the light beams are visible light or invisible light, and the sensor set is a visible light sensor or an invisible light sensor.

In an embodiment of the disclosure, the optical detection device includes multiple linear light sources and multiple sensor sets. Multiple light beams provided by the linear light sources form multiple light curtains. The sensing sets are disposed on a transmission path of the light beams provided by the linear light sources. The linear light sources and the sensor sets are disposed on both sides of the transportation path. The sensor sets sense the light beams provided by the linear light sources not interrupted by the object to be detected to generate multiple sensing signals. The control circuit determines the physical characteristic, the moving speed and the position of the object to be detected according to the sensing signals.

The disclosure further provides a detection method of an optical detection device, including the following steps. At least one linear light source which provides a light curtain formed by multiple light beams is provided, and the light curtain is located on a transportation path of transporting at least one object to be detected, and the object to be detected passes through the light curtain while being transported. At least one sensor set disposed on a transmission path of the light beams is provided, and the linear light source and the sensor set are disposed on both sides of the transportation path, and the sensor set periodically and continuously senses the light beams not interrupted by the object to be detected to generate multiple sensing signals with various strengths. The control circuit determines a physical characteristic, a moving speed and a position of the object to be detected according to multiple sets of continuous sensing signals generated by the sensor set. The control circuit may flexibly adjust a speed of a transportation tool according to the determination result, so as to increase the accuracy and efficiency.

In an embodiment of the disclosure, the linear light source includes multiple light emitting parts, and the light emitting parts are disposed in a straight line, a curved line or a polyline.

In an embodiment of the disclosure, the physical characteristic of the object to be detected includes at least one of a quantity, a density, a size and a thickness of the object to be detected.

Based on the above, the linear light source of the embodiments of the disclosure provides a light curtain formed by multiple light beams, and the light curtain is located on the transportation path of transporting the object to be detected. The sensor set senses the light beams not interrupted or partially interrupted by the object to be detected, so as to generate a sensing signal with various strengths. The control circuit controls the sensor set to periodically and continuously sense the light beams not interrupted by the object to be detected to generate multiple sensing signals, and the control circuit determines the physical characteristic, the moving speed and the position of the object to be detected based on the sensing signals. In some embodiments, the control circuit may flexibly adjust the speed of the transportation tool according to the determination result. In this way, sensing signals with various strengths are generated by sensing the light beams not interrupted or partially interrupted by the object to be detected, which may replace the conventional manual detection method, provides accurate and multi-faceted data analysis, and can effectively improve the detection efficiency for the fine objects to be detected.

DESCRIPTION OF EMBODIMENTS

Figure 1:
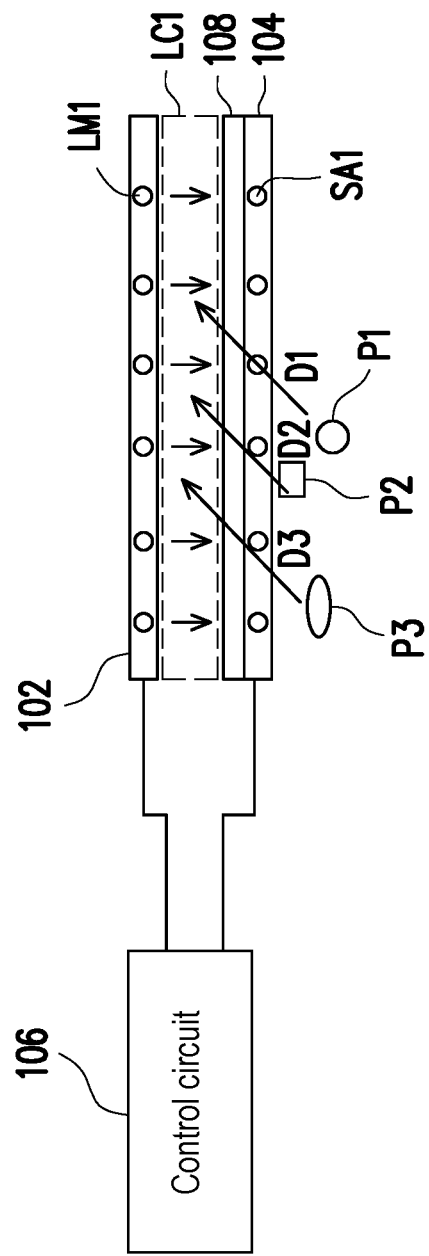
FIG. 1 is a schematic view of an optical detection device according to an embodiment of the disclosure.

FIG. 1 is a schematic view of an optical detection device according to an embodiment of the disclosure. Please refer to FIG. 1. The optical detection device may include a linear light source 102, a sensor set 104 and a control circuit 106, and the control circuit 106 is coupled to the linear light source 102 and the sensor set 104. The linear light source 102 may provide a light curtain LC1 (as shown by the dotted lines) formed by multiple light beams. The light curtain LC1 is located on a transportation path of an object to be detected, and the linear light source 102 and the sensor set 104 are disposed on both sides of the transportation path. For example, in FIG. 1, the transportation path of an object to be detected P1 is D1. The linear light source 102 and the sensor set 104 are disposed on both sides of the transportation path D1, and the object to be detected P1 passes through the light curtain LC1 while being transported along the transportation path D1 (for example, it passes through the light curtain LC1 in a direction perpendicular to the light curtain LC1, but it is not limited thereto; in other embodiments, it may pass through the light curtain LC1 in a direction with a specific angle less than 90 degrees with the normal of the light curtain LC1). Similarly, objects to be detected P2 and P3 also pass through the light curtain LC1 while being transported along their transportation paths D2 the D3, respectively.

In more detail, the linear light source 102 may include multiple light emitting parts LM1. The light emitting parts LM1 may be, for example, light emitting diodes or laser diodes, but they are not limited thereto. In addition, the light emitting parts LM1 may be a visible light source or an invisible light source, so that the light beam emitted by the linear light source 102 is visible light or invisible light. The light emitting parts LM1 may be disposed in a line. For example, in the embodiment of FIG. 1, the light emitting parts LM1 are disposed in a straight line, so that the linear light source 102 is in a straight line. In some embodiments, the linear light source 102 may further include a light guide, which may homogenize the light beams emitted by the light emitting parts LM1.

The sensor set 104 is disposed on the transmission path of the light beams emitted by the linear light source 102. When the light beams of the linear light source 102 are not interrupted by the object to be detected, the sensor set 104 may directly receive the light beams from the linear light source 102. Further, the sensor set 104 may include at least one sensor part SA1. For example, the sensor set 104 may include multiple sensor parts SA1, and the sensor parts SA1 may be disposed in a straight line at equal distances corresponding to the linear light source 102. The sensor set 104 may be controlled by the control circuit 106 to periodically and continuously sense the light beams from the linear light source 102 that are not interrupted by the object to be detected, and correspondingly generate sensing signals to the control circuit 106. The control circuit 106 may determine the physical characteristics, moving speeds and positions of the objects to be detected P1 to P3 according to the sensing signals.

Figure 2:
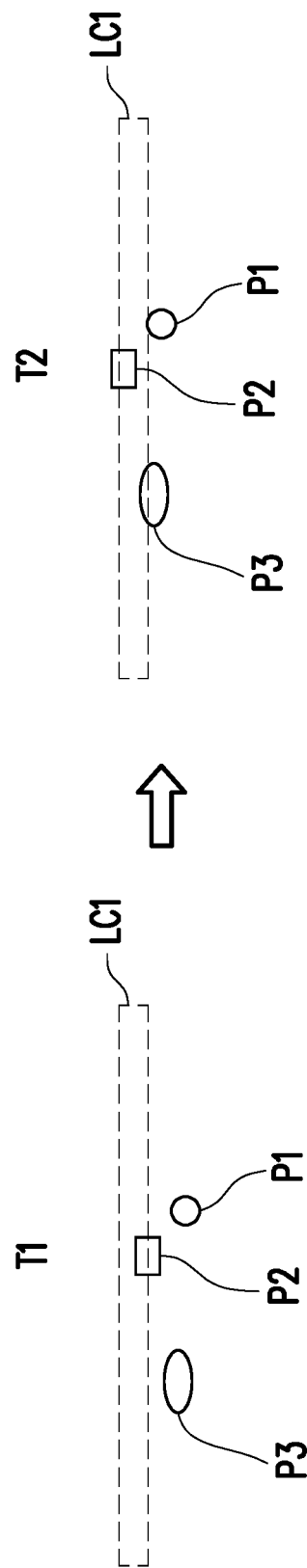
FIGS. 2 and 3 are schematic top views of objects to be detected passing through the light curtain according to an embodiment of the disclosure.

For example, in the embodiment of FIG. 2, at the time T1, a part of the object to be detected P2 enters the sensing area (as shown by the dotted line) formed on the transportation path by the light curtain LC1, and as time elapses, the rest of the object to be detected P2 may enter the light curtain LC1 successively; for example, the rest of the object to be detected P2 has entered the light curtain LC1 at the time T2. The control circuit 106 may control the sensor set 104 to continuously sense the part of the light beams not interrupted by the object to be detected at the time T1 and the time T2 to generate a sensing signal, and determine the physical characteristics, moving speed and position of the object to be detected P2 according to the strength of the sensing signal. Similarly, the physical characteristics, moving speeds and positions of the objects to be detected P1 and P3 may also be determined in the same way. In some embodiments, the control circuit 106 may adjust the sensitivity of the sensor set 104 according to the sensing signal corresponding to the beam intensity of the linear light source 102, or adjust the beam intensity of the linear light source 102 according to the sensing signal, so as to achieve the optimal detection effect.

In more detail, when the distances between the objects to be detected P1, P2 and P3 and the sensor set 104 and between the objects to be detected P1, P2 and P3 and the linear light source 102 are the same when they pass through the light curtain LC1 (for example, the distance between the objects to be detected P1, P2 and P3 and the sensor set 104 is equal to the distance between the objects to be detected P1, P2 and P3 and the linear light source 102), the strength distribution of the sensing signals of the sensor set 104 may represent the light intensity distribution of the light beams received by the sensor set 104, and the light intensity distribution of the light beams may reflect the transparency, quantity, density, size, position and thickness of the objects to be detected P1, P2 and P3. For example, the lower the transparency, the thicker the thickness or the higher the height of the objects to be detected P1, P2 and P3, the more light beams are interrupted and the weaker the strength of the sensing signal. The control circuit 106 may control the sensor set 104 to periodically and continuously sense the light beams not interrupted by the objects to be detected P1, P2, and P3 to generate multiple sets of sensing signals, and determine the range of the interrupted light beams according to these sensing signals, and the range of the interrupted light beams may reflect the contours of the objects to be detected P1, P2, and P3, and the quantity, density, position distribution, moving speed, and size of the objects to be detected P1, P2, and P3 may be determined. In addition, when the objects to be detected P1, P2, and P3 are the same object, the strength of the sensing signal of the sensor set 104 may reflect the distance between the objects to be detected P1, P2, and P3 and the linear light source 102. For example, when the objects to be detected P1, P2 and P3 are closer to the linear light source 102, the objects to be detected P1, P2 and P3 interrupt more light beams provided by the linear light source 102, whereby the distance between the objects to be detected P1, P2 and P3 and the linear light source 102 may be determined. Therefore, the control circuit 106 may determine the transparency, quantity, density, size, position, moving speed and thickness of the objects to be detected P1, P2, and P3 according to the sensing signal.

Further, the sensor set 104 may further include a lens module 108, and the lens module 108 may adjust the range of the light beams not interrupted by the object to be detected irradiating the sensor parts SA1 according to the sensing areas of the sensing surfaces of the sensor parts SA1 of the sensor set 104. For example, when the irradiation range of the light beams emitted by the linear light source 102 is larger than the sensing surfaces of the sensor parts SA1, the lens module 108 may adjust the optical path of the light beams emitted by the linear light source 102, and collect and concentrate the light beams emitted by the linear light source 102 on the sensing surfaces of the sensor parts SA1. For another example, when the irradiation range of the light beams emitted by the linear light source 102 is smaller than the sensing surfaces of the sensor parts SA1, the lens module 108 may amplify the light beams emitted by the linear light source 102 to cover the sensing surfaces of the sensor parts SA1. According to the above, the lens module 108 may also be composed of multiple independent lenses, and each independent lens cooperates with a sensing part to adjust the light beam and the sensing range of the sensing part. The closely-arranged lenses may reduce the gap between the sensor parts, so as to avoid or reduce failure to sense the influence of the passing object to be detected on the beam.

Figure 3:
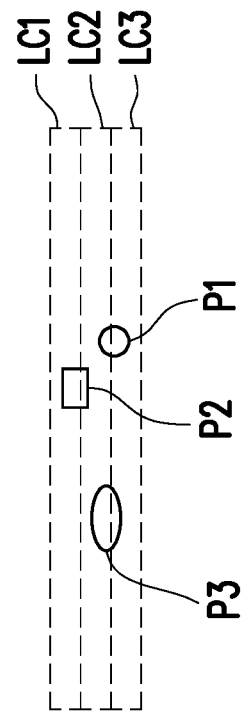

In some embodiments, the number of the linear light source 102 and the sensor set 104 is not limited to one. For example, in the embodiment of FIG. 3, the optical detection device may include three parallel linear light sources 102 and corresponding three sensor sets 104. The configuration of the three parallel linear light sources 102 and the corresponding three sensor sets 104 is similar to the above-mentioned embodiment, and they may be disposed on both sides of the transportation paths D1, D2 and D3, which will not be repeated herein. The three linear light sources 102 may provide three light curtains LC1, LC2, and LC3. The light curtains LC1, LC2, and LC3 may form sensing areas on the transportation paths of the objects to be detected P1, P2, and P3. The control circuit 106 may receive the sensing signals from the three sensor sets 104 at the same time, and may simultaneously determine the physical characteristics, moving speeds and positions of the objects to be detected P1, P2 and P3 according to the sensing signals from the three sensor sets 104.

Figure 4:
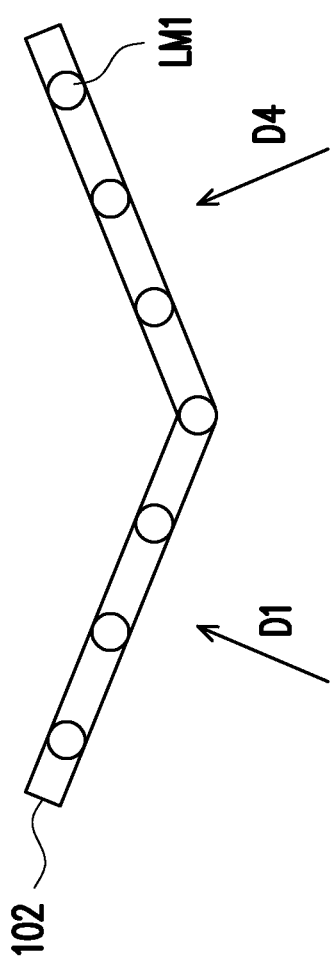
FIGS. 4 and 5 are schematic views of a linear light source according to an embodiment of the disclosure.
Figure 5:
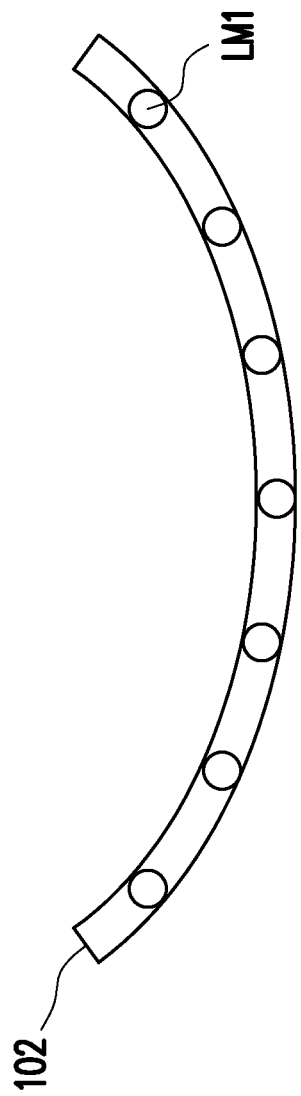

In addition, the shape of the linear light source 102 is not limited to the straight line in the above embodiments. In other embodiments, the linear light source 102 may be a polyline as in FIG. 4 to match the transportation paths D1 and D4 in different directions, so that the objects to be detected on the transportation paths D1 and D4 may pass through the light curtain in a direction perpendicular to the light curtain, so that the configuration of the optical detection device is more flexible. For another example, the shape of the linear light source 102 may be a curve, such as the arc shown in FIG. 5, but it is not limited thereto. In addition, the sensor parts SA1 in the sensor set 104 may also be disposed in a curved line or a polyline at equal distances corresponding to the linear light source 102.

Figure 6:
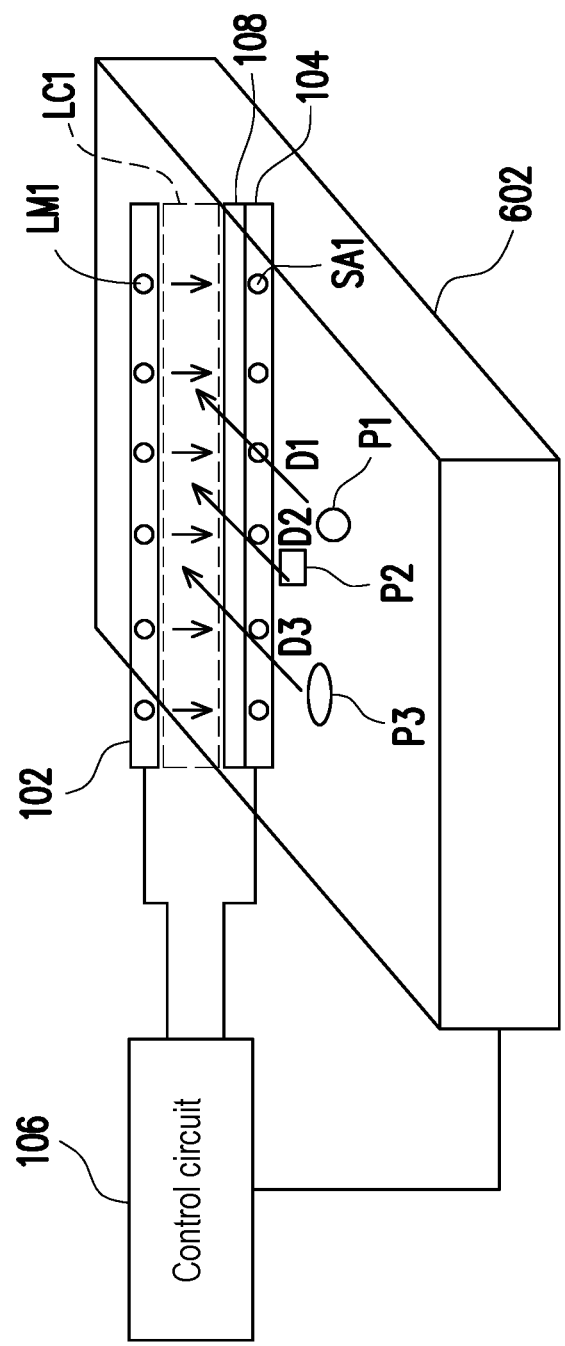
FIG. 6 is a schematic view of an optical detection device according to another embodiment of the disclosure.

In addition, the transportation path of the above-mentioned embodiments may be, for example, a transportation path of a transportation tool to transport the object to be detected, such as the one shown in FIG. 6. In the embodiment of FIG. 6, the optical detection device includes a transportation tool 602 coupled to the control circuit 106. The transportation tool 602 may be, for example, a belt conveyor, or may be configured by different media such as flowing gas or liquid, but it is not limited thereto. In other embodiments, the transportation tool 602 may be, for example, a hanging conveyor or other devices that may provide a transportation path between the sensor set 104 and the linear light source 102 to transport the object to be detected without affecting the optical detection of the object to be detected. The transportation tool 602 may carry the objects to be detected P1, P2, and P3, and is controlled by the control circuit 106 to move the objects to be detected P1, P2, and P3 along the transportation paths D1, D2, and D3 at a predetermined speed. In some embodiments, the control circuit 106 may also control the transportation tool 602 to adjust the speed of moving the objects to be detected P1, P2, and P3 according to the sensing signals provided by the sensor set 104. For example, when the average strength of the sensing signals is lower than a preset value, the speed at which the transportation tool 602 moves the objects to be detected P1, P2, and P3 may be reduced to ensure that the control circuit 106 may obtain sufficient information to determine the physical characteristics, moving speeds and positions of the objects to be detected P1, P2, and P3; and for example, the speed at which the transportation tool 602 moves the objects to be detected P1, P2, and P3 may be increased so that the control circuit 106 may determine the physical characteristics and positions of the objects P1, P2, and P3 sooner, thereby effectively improving the detection efficiency. The objects to be detected P1, P2, and P3 may be directly placed on the transportation platform for transportation, or they may be transported in different media, such as in flowing gas or liquid, but the disclosure is not limited thereto, and they are transported along the transportation paths D1, D2, and D3.

Figure 7:
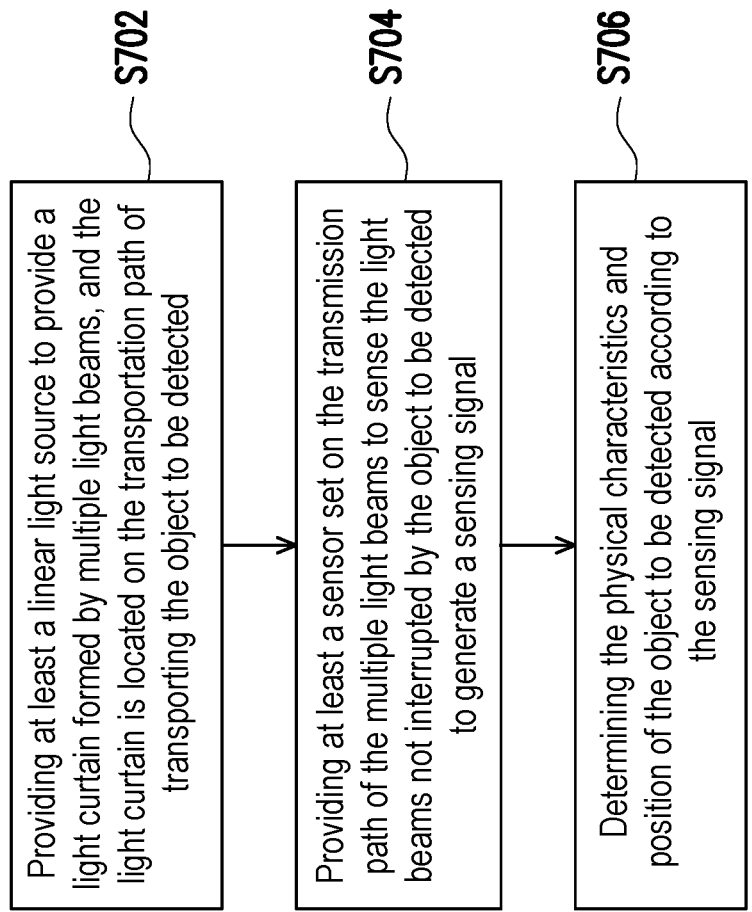
FIG. 7 is a flowchart of a detection method of an optical detection device according to an embodiment of the disclosure.

FIG. 7 is a flowchart of a detection method of an optical detection device according to an embodiment of the disclosure. It may be known from the above embodiments that the detection method of the optical detection device may include at least the following steps. First, at least one linear light source is provided, and the linear light source provides a light curtain formed by multiple light beams, and the light curtain is located on the transportation path of transporting at least one object to be detected (step S702). The object to be detected passes through the light curtain while being transported in the transportation path. The linear light source may include multiple light emitting parts, and the light emitting parts may be arranged in a straight line, a curved line or a polyline. Next, at least one sensor set is provided, which is disposed on the transmission path of the multiple light beams, and the linear light source and the sensor set are disposed on both sides of the transportation path, and the sensor set senses the part of the light beams not interrupted by the object to be detected to generate a sensing signal (step S704). The light beams are visible light or invisible light, and the sensor set is correspondingly a visible light sensor or an invisible light sensor. For example, the control circuit may control the sensor set to periodically and continuously sense the part of the light beams not interrupted by the object to be detected to generate the sensing signal. Finally, the physical characteristics, moving speed and position of the object to be detected are determined according to the sensing signal (step S706). The physical characteristics of the object to be detected may be, for example, at least one of the quantity, density, size and thickness of the object to be detected, but the disclosure is not limited thereto. In some embodiments, the speed of the transportation tool may be adjusted flexibly according to the physical characteristics, moving speed and position of the object to be detected, so as to increase the accuracy and efficiency.

In summary, the linear light source of the embodiments of the disclosure provides a light curtain formed by multiple light beams, and the light curtain is located on the transportation path of transporting the object to be detected. The sensor set senses the part of the light beams not interrupted by the object to be detected, so as to generate a sensing signal. The control circuit determines the physical characteristics, moving speed and position of the object to be detected according to the sensing signal. In this way, the sensing signal is generated by sensing the light beams not interrupted by the object to be detected, which may replace the conventional manual detection method, and may effectively improve the detection efficiency.

What is claimed is:

1. An optical detection device, comprising:
   at least one linear light source providing a light curtain formed by a plurality of light beams, wherein the light curtain is located on a transportation path of transporting at least one object to be detected, and the object to be detected passes through the light curtain while being transported;
   at least one sensor set disposed on a transmission path of the light beams, wherein the linear light source and the sensor set are disposed on both sides of the transportation path, and the sensor set senses the light beams not interrupted by the object to be detected to generate multiple sets of sensing signals, each sensor set includes a plurality of sensor parts of the same size, the plurality of sensor parts are disposed parallel to the linear light source at equal distances, and the plurality of sensor parts periodically and continuously sense the light beams that are not interrupted by the object and generate the multiple sets of sensing signals with various strengths, wherein the intensity distribution of the multiple sets of sensing signals reflect a physical characteristic of the object;
   a control circuit coupled to the linear light source and the sensor set, wherein the control circuit determines the physical characteristic, a moving speed and a position of the object to be detected according to strengths and combination of the multiple sets of sensing signals,
   the control circuit adjusts a sensitivity of the sensor set according to the multiple sets of sensing signals corresponding to a beam intensity of the linear light source; and
   a transportation tool coupled to the control circuit, the control circuit flexibly adjusts a speed of the transportation tool transporting the object to be detected along the transportation path according to the physical characteristic, the moving speed and the position of the object to be detected.

2. The optical detection device according to claim 1, wherein the linear light source comprises a plurality of light emitting parts, and the light emitting parts are disposed in a straight line, a curved line or a polyline.

3. The optical detection device according to claim 2, wherein the sensor set comprises:
   a plurality of sensor parts disposed in a straight line, a curved line or a polyline at equal distances corresponding to the linear light source.

4. The optical detection device according to claim 3, wherein the sensor set further comprises a lens module, and the lens module adjusts a range of the light beams not interrupted by the object to be detected irradiating the sensor parts according to sensing areas of sensing surfaces of the sensor parts of the sensor set.

5. The optical detection device according to claim 1, wherein the physical characteristic of the object to be detected comprises at least one of a transparency, a quantity, a density, a size and a thickness of the object to be detected.

6. The optical detection device according to claim 1, wherein the control circuit further controls a time for enabling the linear light source and the sensor set.

7. The optical detection device according to claim 1, wherein the light beams are visible light or invisible light, and the sensor set is a visible light sensor or an invisible light sensor.

8. The optical detection device according to claim 1, comprising a plurality of linear light sources and a plurality of sensor sets,
   wherein a plurality of light beams provided by the linear light sources form a plurality of light curtains,
   wherein the sensing sets are disposed on the transmission path of the light beams provided by the linear light sources,
   wherein the linear light sources and the sensor sets are disposed on both sides of the transportation path,
   wherein the sensor sets sense the light beams provided by the linear light sources not interrupted by the object to be detected to generate a plurality of sensing signals, and
   wherein the control circuit determines the physical characteristic, the moving speed and the position of the object to be detected according to the sensing signals.

9. The optical detection device according to claim 1, wherein the control circuit further adjust the beam intensity of the linear light source according to the sensing signal.

10. A detection method of an optical detection device, comprising:
    providing at least one linear light source which provides a light curtain formed by a plurality of light beams, wherein the light curtain is located on a transportation path of transporting at least one object to be detected, and the object to be detected passes through the light curtain while being transported;
    providing at least one sensor set disposed on a transmission path of the light beams, wherein the linear light source and the sensor set are disposed on both sides of the transportation path, and the sensor set periodically and continuously senses the light beams not interrupted by the object to be detected to generate multiple sets of sensing signals, each sensor set includes a plurality of sensor parts of the same size, the plurality of sensor parts are disposed parallel to the linear light source at equal distances, and the plurality of sensor parts periodically and continuously sense the light beams that are not interrupted by the object and generate the multiple sets of sensing signals with various strengths, wherein the intensity distribution of the multiple sets of sensing signals reflect a physical characteristic of the object;

determining the physical characteristic, a moving speed and a position of the object to be detected according to strengths and combination of the multiple sets of sensing signals;

adjusting a sensitivity of the sensor set according to the multiple sets of sensing signals corresponding to a beam intensity of the linear light source; and flexibly adjusting a speed of a transportation tool transporting the object to be detected along the transportation path according to the physical characteristic, the moving speed and the position of the object to be detected.

11. The detection method of the optical detection device according to claim 10, wherein the linear light source comprises a plurality of light emitting parts, and the light emitting parts are disposed in a straight line, a curved line or a polyline.

12. The detection method of the optical detection device according to claim 10, wherein the physical characteristic of the object to be detected comprises at least one of a transparency, a quantity, a density, a size and a thickness of the object to be detected.

* * * * *